April 23, 1929.  W. G. PRICE  1,710,032
HYDRAULIC BRAKE
Filed March 30, 1926  5 Sheets-Sheet 1
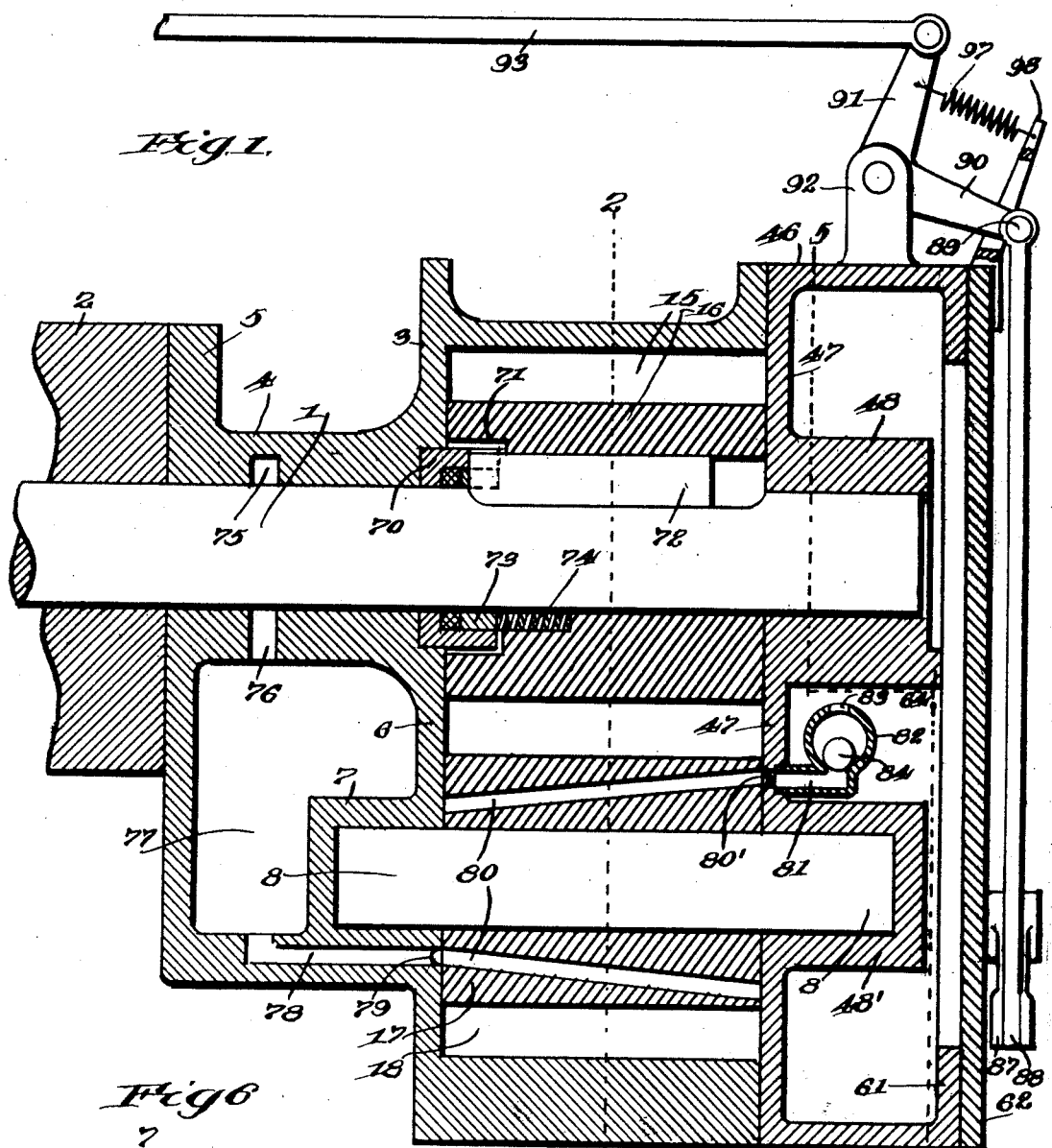
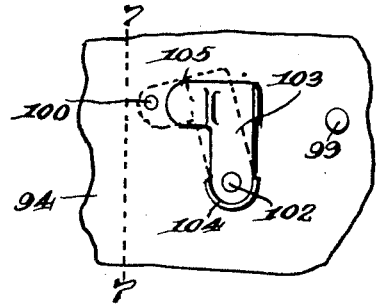
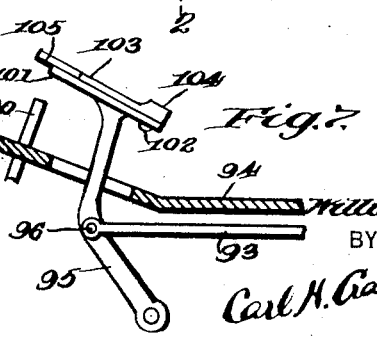
INVENTOR
William Gunn Price
BY
Carl H. Crawford
ATTORNEY

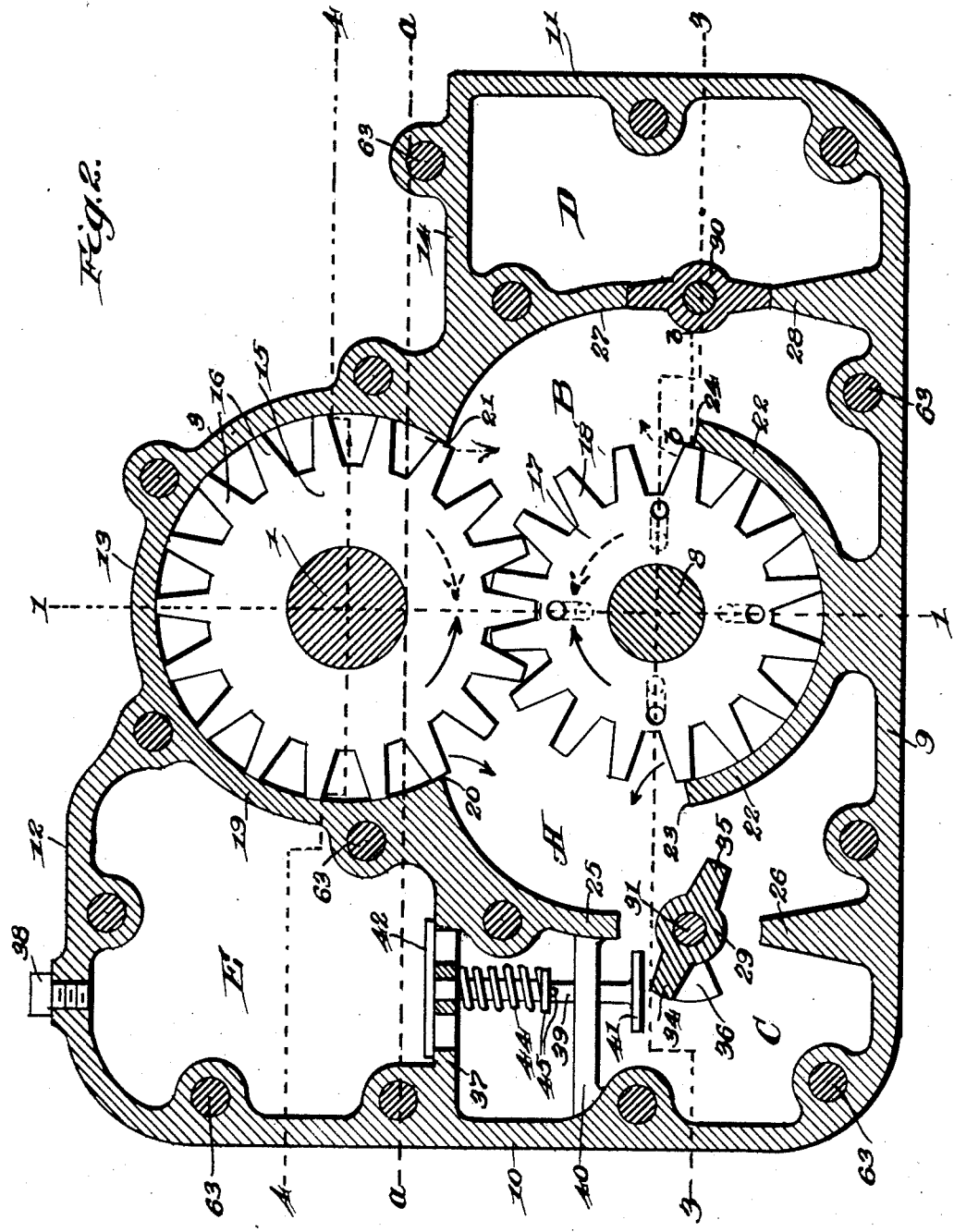

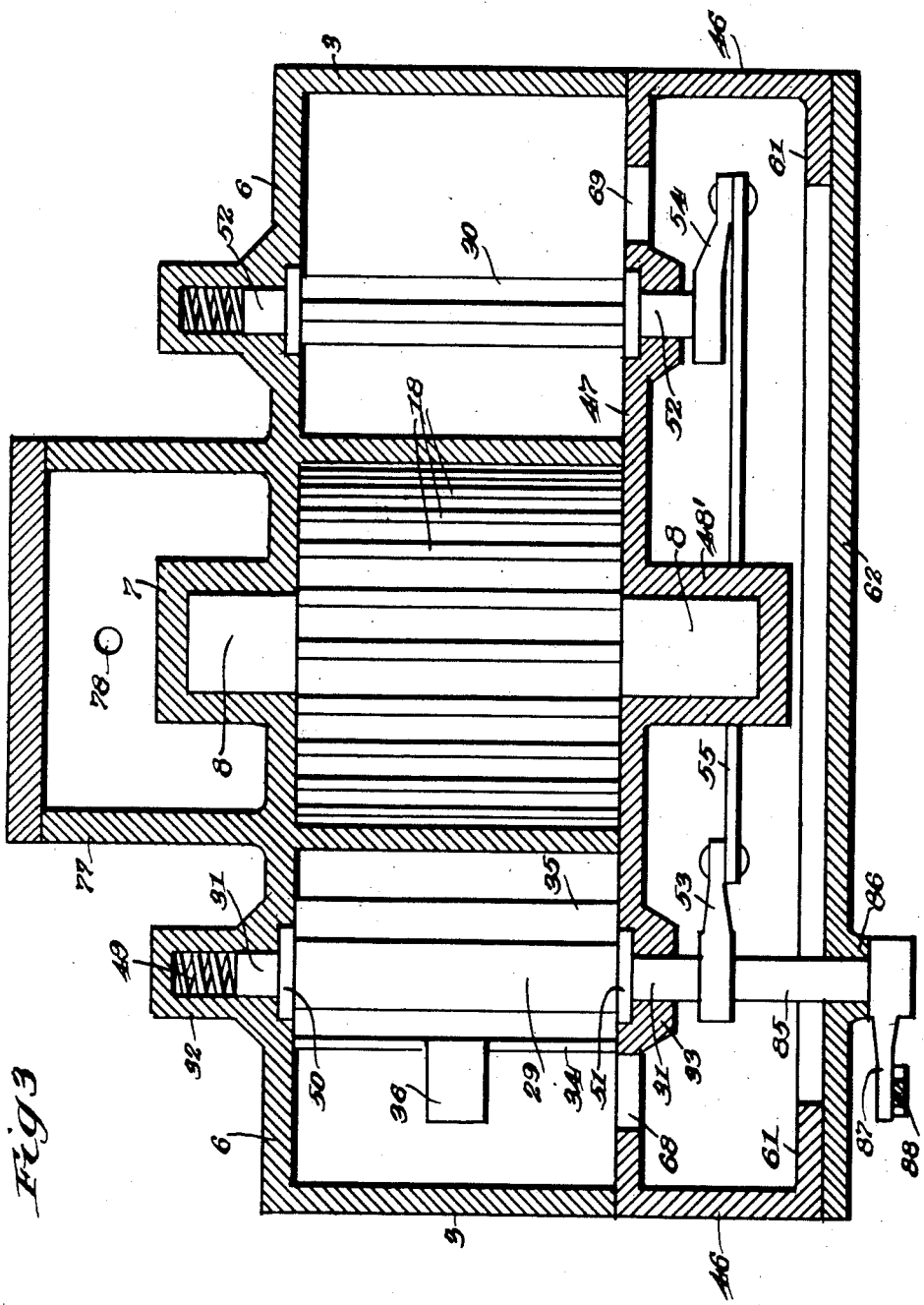

April 23, 1929. W. G. PRICE 1,710,032
HYDRAULIC BRAKE
Filed March 30, 1926 5 Sheets-Sheet 4
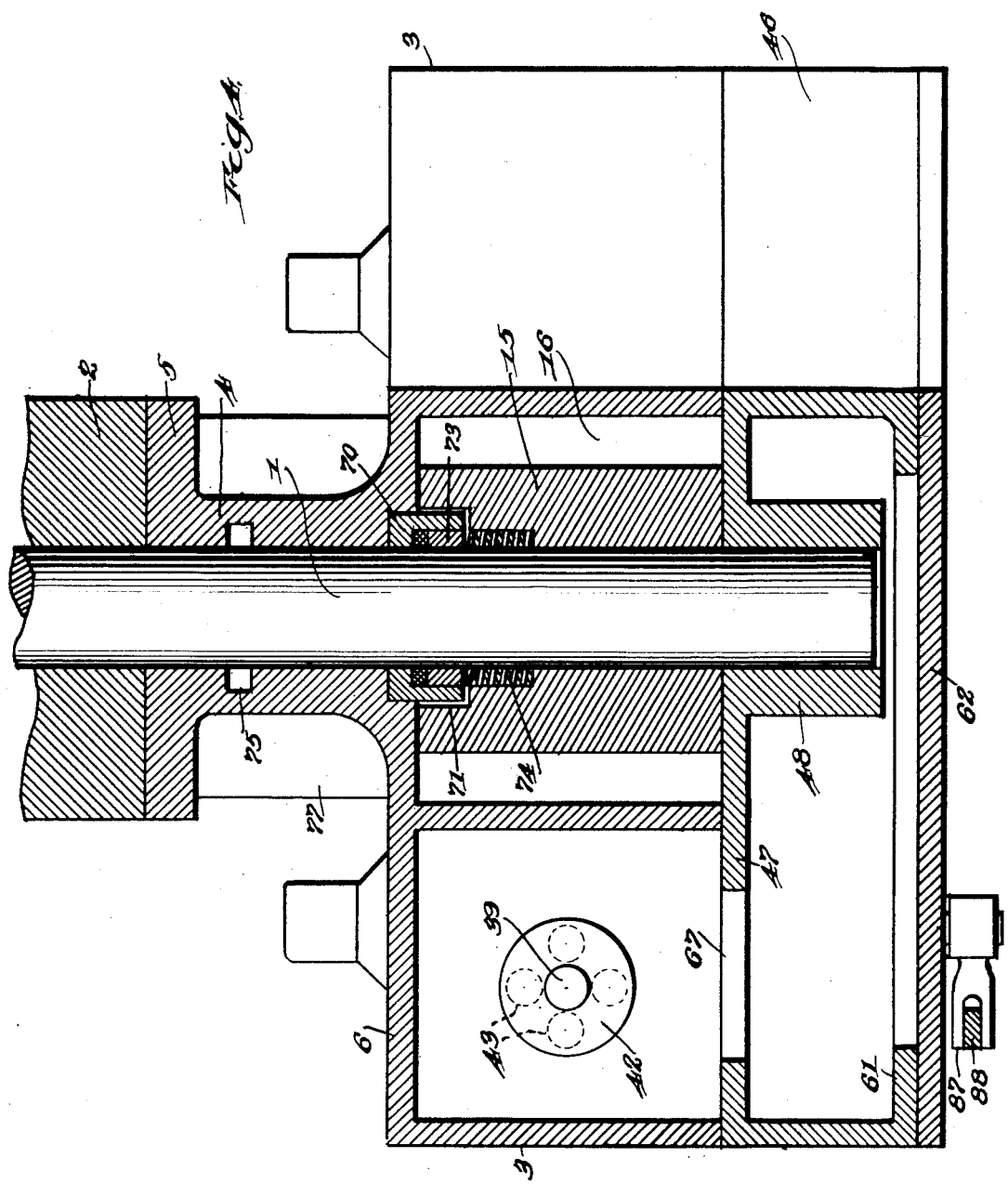
INVENTOR
William Gunn Price
BY
Carl H. Crawford ATTORNEY

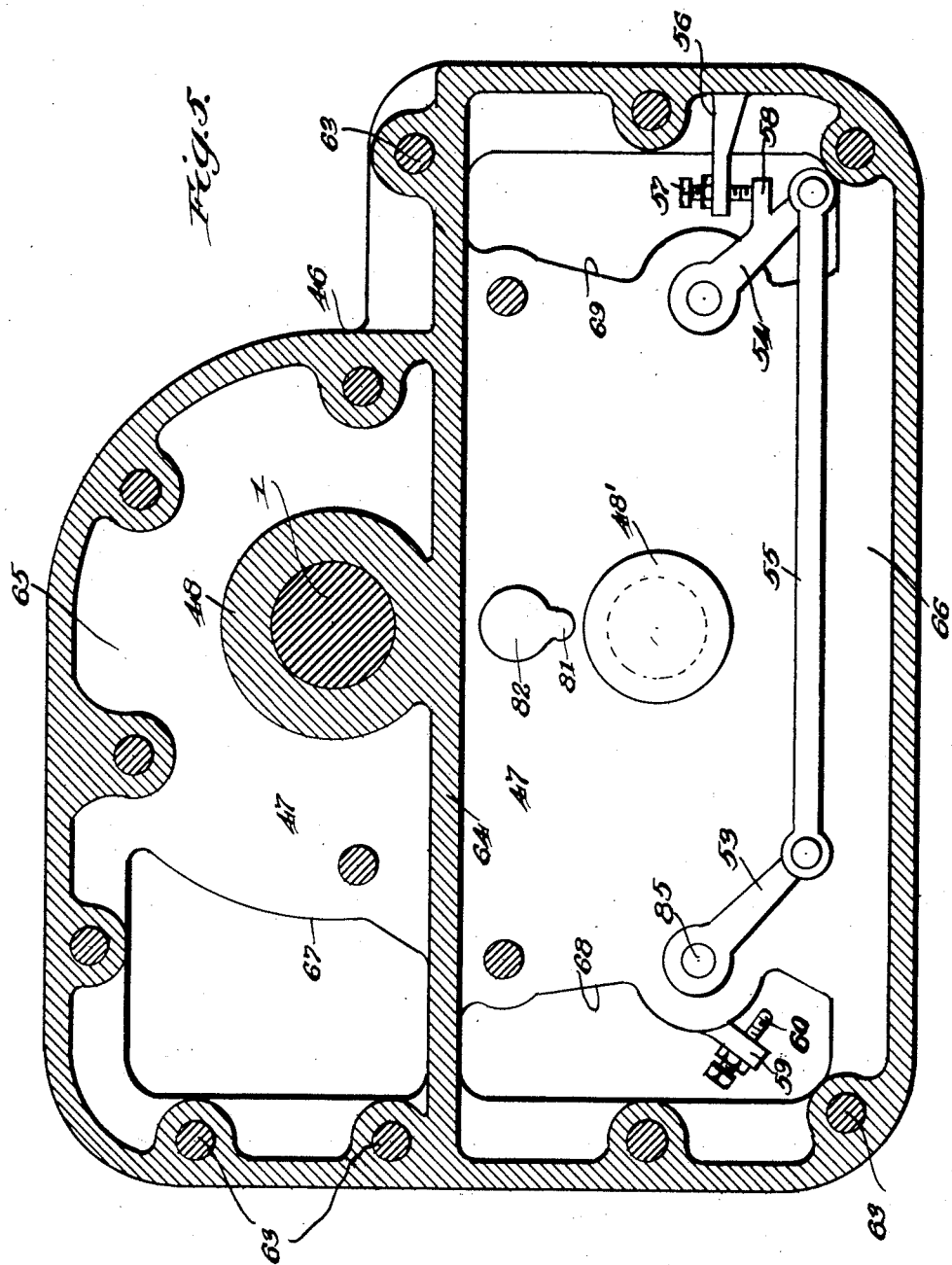

Patented Apr. 23, 1929.

1,710,032

UNITED STATES PATENT OFFICE.

WILLIAM GUNN PRICE, OF YAKIMA, WASHINGTON, ASSIGNOR TO McCLEARY HYDRAULIC BRAKE COMPANY, A CORPORATION OF WASHINGTON.

HYDRAULIC BRAKE.

Application filed March 30, 1926. Serial No. 98,608.

This invention relates to improvements in hydraulic brake mechanism for vehicles and primarily involves that type in which a portion of the brake mechanism is driven by the vehicle.

It is one of the objects of this invention to eliminate the oil drag heretofore imposed as a result of the constantly operated portion of the brake mechanism so that the latter will run entirely free from such drag but will be quickly responsive in the application of braking stress when actuated for such adjustment.

A further object of the invention is to provide a brake of this type which functions in its neutral adjustment to arrest the vehicle against backward movement either on a level road or in the event that the vehicle accidently started backwards down an incline.

A further object is to provide a brake in which the identical character of adjustment required to apply braking stress on forward movement of the vehicle, will free the vehicle for backward movement.

A further object is to provide improved means for recovery and replacement of escaped oil from high pressure regions of the mechanism back into low pressure regions thereof.

My invention involves a novel form of treadle and accelerator control whereby the usual brake treadle lever is equipped with selectively operable means whereby the car can be accelerated with the same movement that is employed to shift the braking treadle toward a brake applying position.

My invention has many other objects and features which will be more fully described in connection with the accompanying drawings and which will be more particularly pointed out in and by the appended claims.

In the drawings:—

Fig. 1, is a sectional view of the device of my invention taken on line 1—1 of Fig. 2.

Fig. 2, is a sectional view taken on line 2—2 of Fig. 1.

Fig. 3, is a horizontal sectional view taken on line 3—3 of Fig. 2.

Fig. 4, is a sectional view taken on line 4—4 of Fig. 2.

Fig. 5, is a sectional view taken on line 5—5 of Fig. 1.

Fig. 6, is a plan view of my novel foot board arrangement.

Fig. 7, is sectional view taken on line 7—7 of Fig. 6.

Like characters of reference designate similar parts throughout the different figures of the drawings.

A portion of my brake mechanism is driven by a vehicularly operated element which, in the present form, consists of an extension 1, of the drive shaft which is suitably projected from the rear differential housing 2, a fragment of which is shown. My improved brake includes a main casing 3, having an extension 4, which outwardly telescopes shaft 1, and which is flanged at 5, for suitable attachment to housing 2.

In view of the fact that a major portion of the mechanism has to do more particularly with the main casing 3, I will first describe the same in detail.

Said main casing has a rear wall 6 closing that side of the casing which is the left hand side viewing Fig. 1, the wall 6, being in this particular construction, a vertically disposed wall. As stated, the extension 4, is journalled on or journals shaft 1, and immediately below the same, wall 6 is provided with a socket journal or bearing 7, in which one end of a shaft 8, of a second gear wheel, is journalled. Next viewing Fig. 2, it will be seen that the main casing involves a lower wall 9, end walls 10 and 11, and a top wall 12, for one portion, and tops walls 13 and 14 for other portions. Mounted on shaft 1, is what I will call a first gear wheel 15 having gear teeth 16, peripherally disposed thereon. Later on, I will specifically refer to one particular means of non-rotatively locking said wheel 15 on shaft 1. Below wheel 15, is what I will term a second gear wheel 17, which is rigidly mounted on shaft 8, and which is provided with peripherally disposed teeth 18, which closely mesh with teeth 16, as clearly shown. The lower portion of the casing, as will be presently described, forms one portion of an endless oil path, and at this point, irrespective of whether the oil path is endless, it is important to state that the gears 15 and 17 are interposed in the oil path, and as before stated, said gears are operated, or operatively driven from the vehicle and operate whenever the vehicle is in motion. As will be seen by reference to Fig. 1, the left hand faces of gears 15 and 17, fit snugly against wall 6, and I will hereinafter describe a wall against which the remaining ends of said gears snugly fit, both side faces of both gears being flat throughout their maximum tooth diameters. I have indicated in full line arrows, the direction of rotation of the gear wheels 15 and 17, when the car or vehicle is moving forwardly, the dotted line arrows indicating the direction of rotation when the vehicle is backing up.

I will next refer to a means of rendering the teeth of gears 15 and 17 effective to act as oil displacing means when they are rotated.

Wall 13, and a wall section 19, forms a peripheral housing for the majority of teeth of wheel 15, above the meshing teeth, the latter and also the teeth approaching and leaving mesh engagement, being exposed. This housing terminates at points 20 and 21. A housing 22, which may be integral with lower wall 9, peripherally encloses a portion of the teeth 18, of wheel 17, leaving the meshing teeth and the teeth approaching and leaving mesh engagement, exposed. By means of this construction, the cavities between the teeth that are housed, are converted into oil buckets and the two coacting wheels perform the function of a pump or oil displacer. If the vehicle is going forwardly, the wheels 15 and 17 displace the oil on their right, viewing Fig. 2, over to their left. I extend the peripheral housings as far as possible partly to lessen the possible extent of leakage passed the teeth, and as regards the lower housing, to insure a quantity of oil on each side equal to a level with the upper edges 23 and 24.

On each side of the gear wheels is what I will term pressure reservoir chambers, and for convenience in the subsequent description of the operation, I will letter these chambers A and B. The inner walls of said chambers A and B, are formed by the housings and gear wheels while the outer walls are designated at 25 and 26, and at 27 and 28, wall 9, forming the bottom wall for both chambers. It is a feature of my invention to make these chambers effective, immediately upon the gears, by controlling the flow of oil into and out of said chambers, and I have shown valve devices 29 and 30, for this purpose. As both valve devices are alike in operation and substantially alike in structure, only one need be described in detail. Valve 29, is oscillated about a horizontal axis, the same being mounted on valve shaft 31, which is shown in Fig. 3, as being journalled in bearings 32 and 33. The valve 29, has wings 34 and 35, which coact with walls 25 and 26, respectively, or the edges thereof, to close ingress to chamber A, from the left thereof in Fig. 2, when said valve 29 is closed, or in other words is in a vertical position. When in the position shown in Fig. 2, free ingress to chamber A, is afforded.

Said valve 29, differs in structure from valve 30, only in the fact that valve 29 has a non-return valve actuating cam 36, the function of which will be presently described.

Laterally outward from the valves 29 and 30, are what I will term terminal chambers C and D. When either of valves 29 or 30, are open, these chambers C and D, are not strictly speaking, terminal chambers as they form a continuation of the endless oil path, as will later appear, but on closure of either of said valves, these chambers C and D, actually form terminal chambers and this separate designation thereof will facilitate the description of the operation.

I will next refer to a novel reserve oil chamber which receives its oil from chamber C, and also discharges oil into said chamber.

Said reserve chamber is designated at E, and is formed by walls 10, 12 and 19, and a partition wall 37. I have shown a filling plug at 38, opening to chamber E, this plug being at the highest elevation with respect to the device as a whole. I have shown a non-return valve control for the oil ingressing to and egressing from chamber E, which involves a stem 39, slidable through wall 37, and a bearing 40, and having on its lower end a cam plate 41, adapted to be engaged by wing 34 and cam 36 not only to elevate the valve but to retain it in an elevated position while valve 29 is moving toward a closing position and after it has reached a closing position. It may be stated that valve 29, as regards wing 34, moves in a clockwise direction, viewing Fig. 2, when closing while valve 30, moves in a contra-clockwise direction when approaching a closed position. Now returning to the non-return valve means, I have shown a closure 42, on stem 39, which serves when seated on wall 37, to close openings 43. If desired, I may use an expansively acting spring 44, to close said non-return valve, said spring being interposed between wall 37, and a washer and pin stop 45, as clearly shown in Fig. 2. However, the weight of the oil on top of closer 42, would ordinarily be sufficient to make the valve action responsive and prompt. It may be stated that the entire right side of the main casing 3, viewing Fig. 1, is open, and I will next refer to the manner in which the same is closed.

The means for closing the right hand side of casing 3, constitutes what I will term an auxiliary casing which will be generally designated at 46, the same having the outlined configuration of casing 3. Said casing has an inner or left hand side wall 47, viewing Fig. 1. On this wall 47, is formed a hub 48, for the end of shaft 1, and a hub bearing 48′, for shaft 8, and also bearing 33, for valve shaft 31. Said wall fits snugly against the right hand faces of gears 15 and 17, viewing Fig. 1, and because wall 47, closes casing 3, it forms the outer or right hand wall thereof. Shaft 31, is insertable in bearing 32, and a spring 49 urges said shaft to the right of Fig. 1. Said shaft 31, has a disc 50 which seats in a suitable recess in wall 6, and a removable disc 51, which permits valve 29 to be telescoped onto shaft 31, seats in a recess in wall 47. Shaft 52, of valve 30, is journalled in the same manner, and hence need not be described in detail. Both shafts 31 and 52, extend into casing 46, and have arms 53 and 54, respectively, fixed thereon. A link 55, is pivotally connected with said arms and insures oscillating movement of said valves 29 and 30, in fixed unison with respect to each other. In the present construction, this fixed unison involves an adjustment such that when valve 29, is moving toward a closing position, valve 30, will be moving toward an opening position, and vice versa. I provide an adjustable stop which consists, as shown, of a stop arm 56, (Fig. 5) in which a stop screw 57, is threaded, and which screw is adapted to engage a lug 58, on arm 54. This limits movement of both valves 29 and 30 in a contra-clockwise direction, viewing Fig. 5. A stop arm 59, having an adjustable stop screw 60, is adapted to engage arm 53, to limit movement of both valves in a clockwise direction, viewing Fig. 5. The first stop, 56, limits opening movement of valve 29 and closing movement of valve 30, and stop 60, limits opening movement of valve 30 and closing movement of valve 29. The right hand wall of casing 46, is open, the same terminating in a flange 61. A cap plate 62, closes casing 46. Bolts, all of which are indicated at 63, in Fig. 2, serve to rigidly unite the sections of the casing structure previously described, and it will be understood that suitable gaskets will, in practice, be interposed between the united parts.

I will next describe what constitutes the endless oil path, reference being first had to Fig. 5.

The casing 46, is divided by a horizontal partition 64 into upper and lower chambers 65 and 66. The upper chamber 65, communicates through opening 67, with the reserve chamber E and hence forms a part thereof. The lower chamber 66, forms a continuation of the oil path in casing 3, said chamber 66 being connected with chamber C, by opening 68, and with chamber D, by opening 69; thus the endless oil path is complete.

I will next describe a novel means for recovering any oil that may escape or work around shaft 1, to the left of Fig. 1.

I have provided a packing means which consists of a female gland ring 70 recessed into extension 4, and projecting into a recess 71, in wheel 15. In order to cause the gland to rotate with wheel 15, I extend a key 72, fixing wheel 15 to shaft 1, into gland ring 70. A male gland member or ring 73, is urged into ring 70, by a series of springs 74, as clearly shown in Fig. 1. Now it will be clear that shaft 1, extending through wheel 15, is disposed in what may be termed a high pressure region of the oil path, and hence, extreme pressures may serve to force some oil past the packing gland. I therefore internally groove extension 4, at 75, and provide an opening 76, leading downwardly from said groove whereby such escaped oil may descend into a recovery chamber 77. In the bottom of said chamber 77, is an oil duct 78, that leads to an arcuately grooved outlet 79. In gear 17, I provide one or more centrifugally acting bores 80, diverging radially outwardly, as will be clearly seen in Fig. 1. As the left hand ends of these bores register with outlet 79, they will pick up oil therefrom and by centrifugal action, such oil will be discharged into an arcuately grooved receiver 80', in wall 47. A pipe 81 leads off from 80, and delivers to a non-return valve consisting of a globe 82, having a discharge opening 83. A ball closure 84, prevents return of oil backwardly from this valve. Now this valve 82 discharges into that section of the oil path which is disposed in casing 46, and which is a low pressure region of the oil path. Thus, I am able to return escaped oil and because of this elimination of loss, it will seldom be necessary to refill the structure.

Reference will next be made to the manner in which the valve devices 29 and 30, are operated from the driver's seat.

First referring to Fig. 3, it will be seen that shaft 31 extends outwardly at 85, through a bearing 86, in plate 62. An arm 87, is mounted on shaft extension 85, and a link 88, is pivoted to arm 87, and extends upwardly as shown in Fig. 1, where its upper end is pivoted at 89, to one arm 90, of a bell crank lever, the other arm thereof being designated at 91. Said bell crank lever is shown pivoted to a bracket 92, and a rod 93, pivoted to arm 91, extends forwardly to the driver's seat or rather the foot board 94, where it is pivoted to brake treadle lever 95, at 96. A spring 97, connected to arm 91, and to a bracket 98, acts normally to hold the parts in the position shown in Fig. 1. In Figs. 6 and 7, I have shown my novel arrangement of controls which I will now describe.

The usual accelerator is indicated at 99 adapted for actuation by the foot of the driver. An auxiliary accelerator is designated at 100, and is connected up in a manner to perform the same function as the main or usual accelerator. The brake lever has a foot rest 101 to which is pivoted at 102, a slide 103 onto which the foot of the driver directly rests, a suitable heel flange 104, serving to retain the heel in place. Said slide 103 has a lateral extension 105, which, when the slide 103 is in the full line or normal position, is out of operative range of accelerator 100. However, by merely shifting the toe of the foot, slightly to the left of Fig. 6, the driver can shift extension 105 over into range of accelerator 100 so that when the brake lever is depressed, this accelerator will also be depressed.

I have now fully described the structure of my invention and I will next describe the manner in which the same operates.

Assuming that the vehicle is first being started ahead when installation has been made with the oil at the level indicated by dotted line $a$—$a$ in Fig. 2, and that the valve devices 29 and 30 are in the position shown in said figure, which is their normal or neutral position, and both chambers A and B entirely filled with oil, the gears 15 and 17 will first transfer all the oil in chamber B, down to level $b$—$b$, over into chamber A. This will result from a very few revolutions of gears 15 and 17. This surplus forced from chamber B into chamber A, will lift valve 42 and pass into chamber E. The valve 42, will close and retain the oil therein. The valve 30, being closed, no oil can enter chamber B from chamber D. This transfer of oil is made upwardly over gear 15 and downwardly under gear 17, in coaction with the housings that convert the cavities between the gear teeth into oil transferring buckets. Thus the oil enters chamber A, in the directions indicated by the arrows.

Now assume, with the parts in the identical adjustment shown in Fig. 2, as just described, that the vehicle was being driven up hill and that the engine was killed or for any reason the vehicle started to back down the hill, the driver would not have to adjust my device at all from this position. The gears 15 and 17 would immediately transfer the oil from chamber A to chamber B; and when the latter was filled, the resistance against the exposed teeth would bring the vehicle automatically to a position of rest in a quickly responsive manner. In other words, the oil, having filled casing chamber B, and valve 30 being closed, the wheels would slide.

Now assume that the parts were in the identical adjustment as shown in Fig. 2, with the driver going ahead, and wishing to apply braking stress, the vehicle being on level ground. The driver would depress lever 95, thereby turning both valves 29 and 30 in a clockwise direction, with valve 30 opening and valve 29 closing. Thus oil is admitted to chamber B, from chamber D, and the gears are still pumping oil from chamber B into chamber A, and egress from chamber A to terminal chamber C, is being cut off by closing movement of valve 29. Now as the gears 15 and 17 are pumping oil into chamber A, from chamber B, and as the valve 29 is gradually closing off egress of oil from chamber A, into terminal chamber C, it will be clear that braking stress will be applied to the vehicle. Thus, it will be seen that braking action is initiated by opening valve 30, as claimed.

In this application of braking stress, just heretofore described, it will be remembered that as valve 29 closes, it will engage cam plate 41, and unseat closure 42, thereby releasing any oil from chamber E, that can find room to enter chamber C. By reason of the cam wing 36, the valve 42 will not only be unseated but will be held unseated as long as valve 29 is closed or partly closed. Thus, on every closing movement of valve 29, the oil in chamber E will be released. When the driver releases the braking action by returning the valves 29 and 30 to the position shown in Fig. 2, the accessible oil from chamber B, will again be quickly transferred to chamber A, and as chamber A, is in this adjustment always substantially filled, it will be seen that braking action, or brake releasing action is almost instantly responsive.

At this point in the description of operation, it is desired to emphasize the vastly important feature of this invention which is, that while I provide an endless path for the oil, the latter is quiescent and does not flow, in the normal or neutral adjustment shown in Fig. 2 because the valve 30 is closed, and this prevents the oil from traversing its endless path. Further, the gear teeth are empty of oil. Thus, I entirely eliminate two kinds of drag on the running vehicle that have always been present in this general type of hydraulic brake, while the brake was not functioning at all as a brake.

I will next describe the operation as applied to backing up the car.

We will assume that the car is at rest, say at a curb, with the parts in the position shown in Fig. 2, which is the neutral or non-braking position, and the driver wanted to back out under power. He would shift slide 103 to the left of Fig. 6, to the dotted line position therein shown. Then he would depress lever 95, and at the same time, and in the one operation, he would gradually actuate the auxiliary accelerator 100. The reason why the brake lever 95 must be depressed preliminarily to back up under power, is that in backing up, the gears rotate in the direction indicated by the dotted arrows, and hence they pump oil into chamber B, therefore, it is necessary to open valve 30 to permit the oil to egress around the circuit or endless path so that the device will be neutral against the power applied to back up the car. It is only when the car is to be backed up under power, that the slide 103 is shifted to actuate the auxiliary accelerator. In the usual depression of lever 95, to apply brakes when the car is going ahead, the slide 103 will be in the full line position shown in Fig. 6. Now, however, it will be clear that the same character of movement, namely, a downward depression of lever 95, is made not only to apply-braking stress when the car is going ahead, but also to release braking stress when the car is being backed under its own power.

It will now be clear that the releasing and entering teeth of both wheels 15 and 17, are in practically the same relation with respect to their respective points of housing terminals 20, 21, and 23, 24. It will also be clear that after the oil has been transferred from chamber B, to chamber A, and the surplus oil has been forced into chamber E, and held by valve 42 therein, that the teeth of wheels 15 and 17 that are exposed to chambers A and B, will be in substantially an equilibrium of pressure, or more accurately speaking, said teeth will move in such an absence of pressure as to practically completely eliminate drag. This is due to the fact that in the non-braking adjustment, shown in Fig. 2, a fairly complete vacuum has been created in chamber B, and that because atmospheric pressure has been practically removed from the oil level by valve 42, chamber A, will necessarily be practically free from atmospheric pressure.

Now the great desideratum of this invention is to eliminate drag on the vehicle when no braking function is being performed. Therefore, when I create a substantial vacuum in chamber B, it will be clear that if I did not substantially eliminate atmospheric pressure in chamber A, there would be a relatively powerful tendency to resist rotation of the wheels 15 and 17, in the direction indicated by the full line arrows. However, by practically eliminating this atmospheric pressure in chamber A, I entirely avoid such drag, which is a feature of primary importance in my invention.

It is believed that the device of my invention will be fully understood from the foregoing description, and while I have herein shown one specific form of my invention, I do not wish to be limited thereto except for such limitations as the claims may import.

I claim:

1. A hydraulic brake adapted for connection with a driven member of a vehicle, comprising, a casing having an endless path for the oil, gear means adapted for driven connection with said member and interposed in the path of the oil to cause the latter to flow in one of two directions dependent upon the direction of movement of the vehicle, pressure balanced rotary devices on opposite sides of said gear means for resisting passage of the oil to impart braking stress to the vehicle, and means connecting said devices to cause one to move toward an oil releasing position when the other device is moving toward an oil restricting position.

2. A hydraulic brake adapted for connection with a driven member of a vehicle, comprising, a casing having an endless path for the oil, gear means adapted for driven connection with said member and interposed in the path of the oil to cause the latter to flow in one of two directions dependent upon the direction of travel of the vehicle, pressure balanced rotary devices on opposite sides of said gear means for resisting passage of the oil to impart braking stress to the vehicle, and means connecting said devices to move in positive unison, said connection being such that when one device is moving toward an oil releasing position the remaining device will be moving toward an oil restricting position.

3. A hydraulic brake adapted for connection with a driven member of a vehicle, comprising, a casing having a passage for the oil, means adapted to be driven by said member for causing the oil to move in one of two directions in said passage dependent upon the direction of movement of the vehicle, pressure balanced devices on opposite sides of said means for resisting movement of the oil by said means to impart braking stress to the vehicle, and mechanism for actuating said devices to cause one of said devices to restrict the oil movement while the remaining device releases such movement.

4. A hydraulic brake adapted for connection with a driven member of a vehicle, comprising, a casing having a passage for the oil, devices for controlling the movement of the oil in said passage, said passage having reservoir pressure chambers between said devices, means interposed in the passage between said chambers for moving the oil into one or the other of said chambers, and mechanism for closing the device adjacent the chamber being emptied and opening the device adjacent the chamber being filled when no braking duty is performed to free said means from oil drag, and said mechanism opening the device adjacent the emptying chamber and closing the device adjacent the filling chamber to impart braking stress to the vehicle through said means.

5. In combination, a vehicle, a hydraulic brake mechanism therefor comprising a casing having an oil path, a reserve chamber above said oil path, vehicle operated means interposed in said oil path for moving the oil from one side of said means to the other and into said reserve chamber, and means for releasing the oil in said reserve chamber for gravity return to said oil path.

6. In combination, a vehicle, a hydaulic brake mechanism therefor comprising a casing having an oil path, a reserve chamber above said oil path, vehicle operated means interposed in said oil path for moving the oil from one side of said means to the other and partly into said reserve chamber, a device for controlling the movement of oil between said path and reserve chamber to initiate braking action through said means, and a non-return valve for holding the oil in said reserve chamber, and said device having means for actuating said non-return valve to release the oil in said reserve chamber for return of said oil to said oil path.

7. In a casing structure for a vehicular hydraulic brake mechanism, main and auxiliary casings partitioned to form a lower endless oil path and an upper oil reserve chamber.

8. In a casing structure for a vehicular hydraulic brake mechanism, main and auxiliary casings horizontally partitioned to form a lower endless oil path and an upper oil reserve chamber, and non-return means for controlling movement of oil from said chamber to said oil path.

9. In a vehicular hydraulic brake mechanism, a casing having an oil path, closely meshing vehicle operated gears interposed in said path, said casing having shells peripherally enclosing a majority of the teeth of said gears and leaving the meshing teeth and also a minority of teeth approaching and leaving mesh engagement exposed for delivery and intake of oil, respectively, whereby one character of rotation of the gears will transfer all accessible oil from the intake to the delivery side of said gears filling the latter and vacating the former, and a valve device normally closing the intake side to a supply of oil, whereby should the vehicle accidently back down a hill the resultant reverse movement of the gears will transfer the oil back to the closed intake side thereby creating a pressure that will automatically arrest the vehicle without requiring previous adjustment of said valve device.

10. In a vehicular hydraulic brake mechanism, a casing having an endless oil path, vehicle operated gears interposed in the oil path whereby said gears in one character of rotation will transfer all accessible oil from the intake side to the delivery side of said gears, said endless oil path including a chamber on each side of said gears, valve devices controlling ingress and egress of oil to and from said chambers as regards the total oil volume in the endless path, means connecting said valve devices to operate in predetermined relation with one of said devices moving toward a closing position when the other is moving toward an opening position and vice versa, and mechanism for operating said means to close the valve device at the intake side and open the valve device at the delivery side when no braking function is desired whereby in such adjustment the vehicle will be automatically arrested should it accidently back down hill, said mechanism serving on forward movement of the vehicle to adjust said means to close the delivery valve device and open the intake valve device to apply braking stress to the vehicle.

11. In a vehicular brake device, a hydraulic brake mechanism having a portion thereof operated by the vehicle, and means for shifting said mechanism into a non-braking or neutral adjustment for freeing forward and arresting backward movement of the vehicle.

12. The combination with a hydraulic brake mechanism having an endless oil path and one portion thereof having a low pressure region, a shaft extending into a pressure region of said path and having packing means for arresting a major portion of escaping oil, said mechanism having a revolving member provided with a centrifugally acting bore to a low pressure region of said oil path, means preventing return of the oil backwardly from its delivered direction, and a recovery chamber communicating with said shaft to receive escaped oil and delivering the escaped oil to said contrifugally acting bore.

13. A hydraulic brake device for motor driven vehicle, comprising, a casing having an oil path, vehicle driven oil displacing gears interposed in said oil path, and mechanism acting when no braking function is performed to create a substantial vacuum on one side of said gears and reduce atmospheric pressure sufficiently on the remaining side of said gears to cause said gears to run free from drag when no braking function is performed.

14. In a vehicular hydraulic brake mechanism, a casing having an oil path, vehicle driven gears interposed in said path whereby one character of rotation of said gears will transfer oil from the intake to the delivery side of said gears, and a valve device normally closing the intake side to a supply of oil, whereby should the vehicle accidently back down hill the resultant reverse movement of the gears will transfer oil back to the closed intake side thereby creating a pressure that will automatically arrest the vehicle.

15. In combination, a vehicle, a hydraulic brake mechanism therefor having an oil supply, and a single device for admitting oil to initiate braking operation of said mechanism, or shutting off oil to free said mechanism from oil drag and permit forward movement of said vehicle and arrest rearward movement of the latter.

In testimony that I claim the foregoing as my own, I hereby affix my signature.

WILLIAM GUNN PRICE.